United States Patent [19]

Watanabe

[11] Patent Number: 4,849,632

[45] Date of Patent: Jul. 18, 1989

[54] RADIATION IMAGE READ-OUT METHOD AND APPARATUS

[75] Inventor: Hideo Watanabe, Kanagawa, Japan

[73] Assignee: Fuji Photo Film Co., Ltd., Kanagawa, Japan

[21] Appl. No.: 782,813

[22] Filed: Oct. 2, 1985

[30] Foreign Application Priority Data

Oct. 5, 1984 [JP] Japan ................. 59-209066

[51] Int. Cl.⁴ .......................................... G03C 5/16
[52] U.S. Cl. ........................ 250/327.2; 250/484.1
[58] Field of Search ............. 250/327.2, 484.1

[56] References Cited

U.S. PATENT DOCUMENTS

| | | | |
|---|---|---|---|
| 4,258,264 | 11/1984 | Kotera et al. | 250/327.2 |
| 4,346,295 | 1/1985 | Tanaka et al. | 250/327.2 |
| 4,571,493 | 2/1986 | Horikawa | 250/327.2 |
| 4,591,715 | 5/1986 | Goto | 250/484.1 |

FOREIGN PATENT DOCUMENTS

| | | | |
|---|---|---|---|
| 56-11395 | 2/1981 | Japan | 250/327.2 |
| 60-119166 | 6/1985 | Japan | 250/327.2 |

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

In a radiation image read-out method and apparatus, light emitted by a stimulable phosphor sheet carrying a radiation image stored therein, when it is exposed to stimulating rays, is detected by a photoelectric read-out unit comprising three or more photodetectors positioned side by side in the scanning line direction. From the output of the at least one photodetector, which receives the light emitted by a scanning point, outputs of the other photodetectors, multiplied by a predetermined coefficient, are subtracted. The result of the subtraction is used as a read-out image signal.

6 Claims, 2 Drawing Sheets

RADIATION IMAGE READ-OUT METHOD AND APPARATUS

BACKGROUND OF THE INVENTION

1. Field of the Invention

This invention relates to a radiation image read-out method in a radiation image recording and reproducing system wherein a stimulable phosphor sheet is used, and an apparatus for carrying out the method

2. Description of the Prior Art

When certain kinds of phosphors are exposed to a radiation, such as X-rays, α-rays, β-rays, γ-rays, cathode rays or ultraviolet rays, they store a part of the energy of the radiation. Then, when the phosphor, which has been exposed to the radiation, is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted into an electric image signal, which is processed as desired to reproduce a visible image on a recording medium such as a photographic light-sensitive material or on a display device such as a cathode ray tube (CRT).

FIG. 5 is a perspective view showing the conventional read-out apparatus, used in the aforesaid radiation-image recording and reproducing system for scanning a stimulable phosphor sheet carrying a radiation image stored therein by stimulating rays, such as a laser beam, which cause the sheet to emit light in proportion to the stored radiation energy, and photoelectrically detecting that emitted light.

In the apparatus of FIG. 5, stimulating rays 2 are emitted by a stimulating ray source 1, and the beam diameter of the stimulating rays 2 is strictly adjusted by a beam expander 3. The stimulating rays 2 are then deflected by a light deflector 4 formed of a galvanometer mirror or the like, and are made to impinge upon the stimulable phosphor sheet 10 by a plane reflection mirror 5. Between the light deflector 4 and the plane reflection mirror 5 is positioned an fθ lens 6 for maintaining uniform the beam diameter of the stimulating rays 2 during the equal-speed scanning of the stimulating rays 2 in the main scanning direction as indicated by the arrow A on the stimulable phosphor sheet 10. While the stimulating rays 2 impinge upon the stimulable phosphor sheet 10, the sheet 10 is moved in the direction as indicated by the arrow B (i.e. sub-scanning direction) and consequently, the whole area of the sheet 10 is exposed to and scanned by the stimulating rays 2. Upon exposure to the stimulating rays 2, the stimulable phosphor sheet 10 emits light in proportion to the radiation energy stored therein, and the light emitted enters a light guide member 8. The light guide member 8 has a linear light input face 8a positioned close to a scanning line 2a on the stimulable phosphor sheet 10, and a ring-shaped light output face 8b in close contact with the light receiving face of a photodetector 9, which may be a photomultiplier. The light guide member 8 and the photodetector 9 constitute a photoelectric read-out means 7. The light guide member 8 is fabricated of a transparent thermoplastic resin sheet such as an acrylic resin sheet so that the light entering from the light input face 8a can be transmitted to the light output face 8b by total reflection within the light guide member 8. The light emitted by the stimulable phosphor sheet 10 upon stimulation thereof is directed into the light guide member 8, emitted from the light output face 8b of the light guide member 8 and received by the photodetector 9. The light guide member 8 may be of a shape and a material as disclosed in U.S. Pat. No. 4,346,295.

The light detected by the photodetector 9 is converted thereby into an electric signal, and the output signal of the photodetector 9 is amplified, A/D converted and subjected to a signal processing. Thereafter, the electric signal is used for reproducing a visible image on a recording material such as a photographic film or on a display device such as a CRT.

However, when the time interval between radiation image recording on a stimulable phosphor sheet and image read-out therefrom is short in the aforesaid conventional radiation image read-out apparatus, not only the light emitted by the stimulable phosphor sheet, in proportion to the stored radiation energy when the sheet is exposed to stimulating rays, but also a radiation after-glow (noise) are detected by the photodetector. Therefore, the radiation image is not detected accurately, and the contrast of the reproduced visible image becomes low.

By "radiation after-glow" is meant the after-glow of light instantaneously emitted by the stimulable phosphor when it is exposed to radiation for image recording. This radiation after-glow continues to be emitted by the whole exposed surface of the stimulable phosphor sheet 10 for a fixed time after it is exposed to radiaiton.

Specifically, in the aforesaid conventional radiation-image read-out apparatus, the light input face 8a of the light guide member 8 is positioned facing the scanning line 2a over the whole width of the stimulable phosphor sheet 10 in the main scanning direction, and all light entering the light guide member 8 from its light input face 8a is detected by the photodetector 9. Therefore, the radiation after-glow emitted by the whole width region of the stimulable phosphor sheet 10 placed close to the light input face 8a is detected by the photodetector 9, and the aforesaid problems are caused by the detected radiation after-glow.

In the present invention, detection of the light emitted by the stimulable phosphor sheet in proportion to the stored radiation energy when it is scanned by stimulating rays is sometimes referred to as "read-out from the stimulable phosphor sheet".

SUMMARY OF THE INVENTION

The primary object of the present invention is to provide a radiation image read-out method wherein a signal representing the radiation after-glow detected together with the light emitted by a stimulable phosphor sheet in proportion to the stored radiation energy during the read-out from the stimulable phosphor sheet is eliminated from the read-out image signal, thereby obtaining an image signal free from noise.

Another object of the present invention is to provide an apparatus for carrying out the method The present invention provides a radiation image read-out method for scanning a stimulable phosphor sheet carrying a radiation image stored therein by stimulating rays which cause the stimulable phosphor sheet to emit light in proportion to the stored radiation energy, and detecting the emitted light by a photoelectric read-out means, wherein the improvement comprises the steps of:

(i) conducting detecting by said photoelectric read-out means by use of a photoelectric read-out means comprising three or more photodetectors positioned side by side in the scanning line direction;

(ii) from the output of at least one of said photodetectors which receives a substantial proportion of the light emitted by a scanning point at a given instant (i.e. a readout picture element exposed to the stimulating rays), subtracting the outputs of the other of said photodetectors which receive a lesser proportion of the light emitted at a given instant multiplied by a predetermined coefficient, and (iii) using the result of the subtraction as the read-out image signal In the radiation-image read-out method of the present invention, the photodetector which detects the light emitted by the scanning point at a given instant and the other photodetectors which do not, or little detect the light emitted by the stimulable phosphor sheet in proportion to the stored radiation energy and generally detect only a noise component such as the radiation after-glow subject these photodetectors are discriminated from each other. A noise component mainly constituted by the radiation after-glow and contained in the output of the former photodetector is calculated by multiplying the outputs of the latter photodetectors by a predetermined coefficient. The noise component thus calculated is subtracted from the output of the former photodetector. As the scanning advances from point to point, each of the three or more photodetectors changes from the former photodetector to the latter photodetectors or vice versa.

The radiation image read-out method of the present invention is carried out by an apparatus provided with a stimulating ray source for emitting stimulating rays, a light deflection means for scanning a stimulable phosphor sheet carrying a radiation image stored therein by said stimulating rays which cause said stimulable phosphor sheet to emit light in proportion to the stored radiation energy, and a photoelectric read-out means for detecting the emitted light, wherein the improvement comprises the provision of:

(i) three or more photodetectors constituting said photoelectric read-out means and positioned side by side in the scanning line direction, (ii) a position detection means for detecting the position of a scanning point, (iii) a first switching section for connecting or disconnecting the output of each of said photodetectors on the basis of information on the position of the scanning point generated by said position detection means so that only the output of at least one of said photodetectors which is positioned within a predetermined range in the vicinity of the scanning point is connected, (iv) a second switching section for connecting or disconnecting the output of each of said photodetectors on the basis of information on the position of the scanning point generated by said position detection means so that only the output of at least one of said photodetectors which is positioned outside of said at least one of said photodetectors which is positioned within the predetermined range in the vicinity of the scanning point is connected, and (v) an operation means for subtracting the total of the output at said second switching section multiplied by a predetermined coefficient from the total of the output at said first switching section.

In the present invention, it is possible to eliminate the noise component such as a radiation after-glow from the read-out image signal, and to accurately obtain an image signal used for reproducing a visible image.

DESCRIPTION OF THE PREFERRED EMBODIMENTS

The present invention will hereinbelow be described in further detail with reference to the accompanying drawings.

The radiation image read-out apparatus in accordance with the present invention is of the type wherein the photoelectric read-out means comprises three or more photodetectors positioned side by side in the scanning line direction. The apparatus of this type will first be described with reference to FIG. 3.

Figure 3:
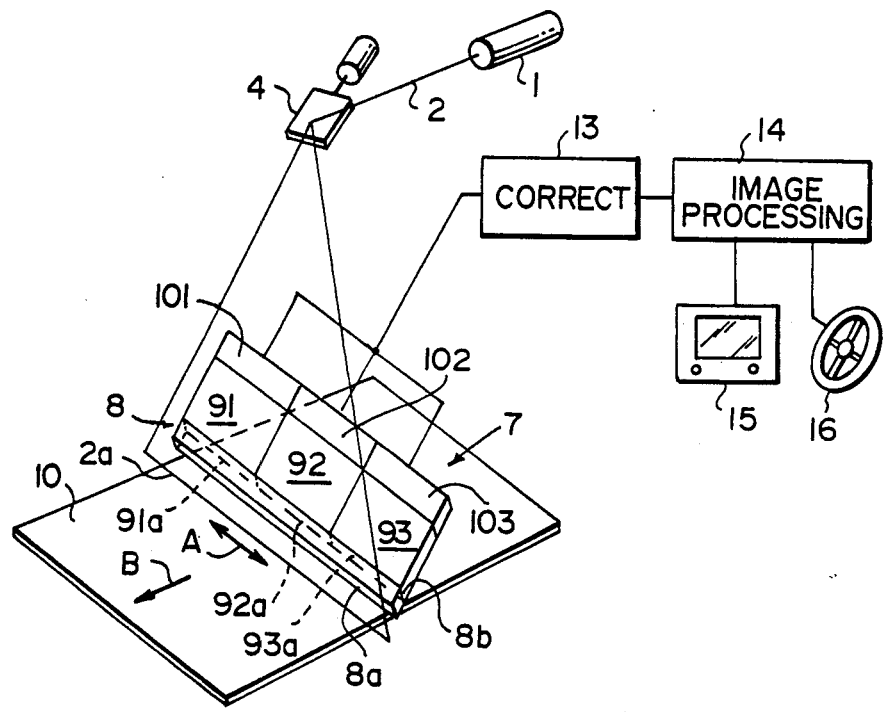
FIG. 3 is a schematic view showing an example of the radiation image read-out apparatus provided with a plurality of photodetectors on which the radiation image read-out apparatus of the present invention is based.

FIG. 3 shows an example of the apparatus of the aforesaid type which is described in Japanese Patent Application No. 58(1983)-227543. The apparatus aims at eliminating the drawbacks of the conventional apparatus shown in FIG. 5 as described below: i.e. (1) when light detection is conducted by use of the light guide member 8 and the photodetector 9, since the light guide member 8 is partially rounded cylindrically, the length from the light input face 8a to the light output face 8b of the light guide member 8 becomes large, and therefore the photoelectric read-out means 7 becomes large, (2) since the distance between the light input face 8a and the photodetector 9 is different among various portions of the light guide member 8, the degree of light loss becomes different among various portions of the light guide member 8, and nonuniformity of sensitivity arises, and (3) the light guide member 8 having the complicated shape described above is difficult to fabricate.

Figure 5:
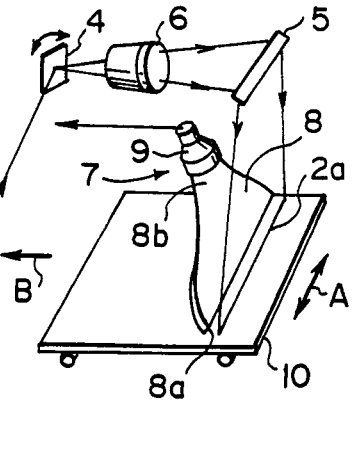
FIG. 5 is a schematic view showing the conventional radiation image read-out apparatus.

In FIG. 3, similar elements are numbered with the same reference numerals with respect to FIG. 5. A photoelectric read-out means 7 comprises an elongated plate-shaped light guide member 8 longer than the width of the stimulable phosphor sheet 10, a plurality of (by way of example, three) photodetectors, for example, photomultipliers 91, 92 and 93, closely contacted with the light guide member 8, and pre-amplifiers 101, 102 and 103 connected to the photomultipliers 91, 92 and 93. The light guide member 8 is fabricated of a material exhibiting a high light transmittance, such as an acrylic resin A front end face (end face at one long side) of the light guide member 8 placed face to face with the stimulable phosphor sheet 10 is formed as a light input face 8a, and a rear end face (end face at the other long side) of the light guide member 8 is formed as a light output face 8b. The photomultipliers 91, 92 and 93 generate electric signals in accordance with the intensities of light entering from light receiving faces 91a, 92a and 93a thereof. The photomultipliers 91, 92 and 93 are closely contacted with each other, and the light receiving faces 91a, 92a and 93a are closely contacted with the light output face 8b of the light guide member 8 by adhesion or the like. That is, the whole length of the light output face 8b is covered by the light receiving faces 91a, 92a and 93a.

Outputs of the pre-amplifiers 101, 102 and 103 for amplifying the electric signals generated by the photomultipliers 91, 92 and 93 are sent to an image processing circuit 14 via a correction circuit 13, and the electric signals processed by the circuit 14 are used to reproduce a visible image on a CRT 15 or stored in a magnetic tape 16.

When the photomultipliers 91, 92 and 93 are positioned side by side as described above, since dead zones are present at end portions of the photomultipliers 91, 92 and 93, deterioration in sensitivity arises at the contact portions between the photomultipliers 91 and 92 and between the photomultipliers 92 and 93. The correction circuit 13 is provided for eliminating the deterioration in sensitivity.

Figure 4:
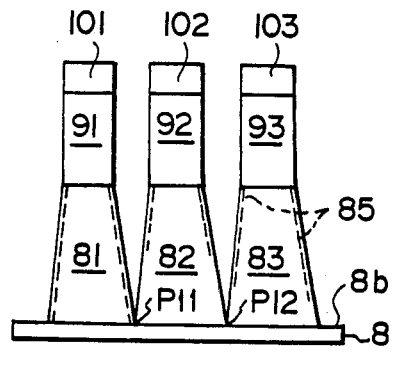
FIG. 4 is a schematic view showing an example of the photoelectric read-out means in the apparatus of FIG. 3.

In the apparatus of FIG. 3, the photomultipliers 91, 92 and 93 are directly contacted with the light output face 8b of the elongated light guide member 8. However, as shown in FIG. 4, it is also possible to optically associate the light output face 8b of the elongated light guide member 8 with the photomultipliers 91, 92 and 93 via light guide member pieces 81, 82 and 83. In this case, it becomes possible to minimize deterioration in sensitivity at a boundary P11 between the light guide member pieces 81 and 82 and at a boundary P12 between the light guide member pieces 82 and 83. Also, when the side end faces of the light guide member pieces 81, 82 and 83 are formed as mirror faces 85, 85, . . . , light loss at the light guide member pieces 81, 82 and 83 is minimized.

The radiation image read-out apparatus of the present invention is provided with three or more photodetectors positioned side by side along the scanning line 2a as described above, and is further provided with a position detection means for detecting the position of a scanning point, first and second switching sections, and an operation means.

An embodiment of the radiation image read-out apparatus in accordance with the present invention will hereinbelow be described with reference to FIG. 1. By way of example, FIG. 1 shows the case where four photodetectors are provided In FIG. 1, similar elements are numbered with the same reference numerals with respect to FIGS. 3, 4 and 5.

Figure 1:
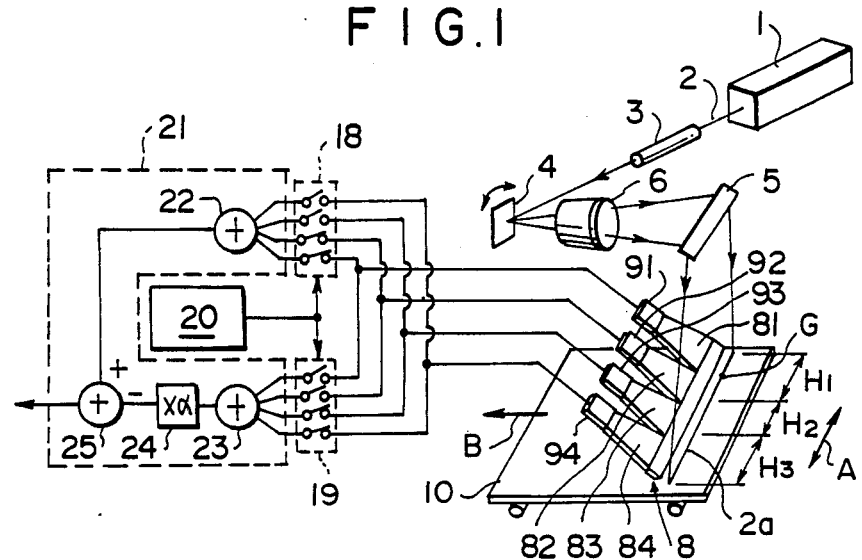
FIG. 1 is a schematic view showing an embodiment of the radiation image read-out apparatus in accordance with the present invention.

In FIG. 1, a photoelectric read-out means 7 comprises an elongated plate-shaped light guide member 8 positioned to face a scanning line 2a, light guide member pieces 81, 82, 83 and 84 connected to the light guide member 8, and photomultipliers 91, 92, 93 and 94 connected as photodetectors to the light guide member pieces. Outputs of the photomultipliers 91, 92, 93 and 94 are sent to a first switching section 18 and a second switching section 19.

The switching sections 18 and 19 receive the output (information on the position of a scanning point) of a scanning position detection means 20 for detecting the position of a scanning point G on the scanning line 2a, and connects or disconnects the outputs of the photomultipliers 91, 92, 93 and 94 on the basis of the output of the scanning position detection means 20.

The scanning position detection means 20 may be of the type detecting the position of the scanning point on the basis of a drive signal of a galvanometer mirror 4 used as a light deflection means, or of the type detecting the position of the scanning point by constituting a plane reflection mirror 5 by a semi-transparent mirror, making the stimulating rays passing through the semi-transparent mirror impinge upon a grid (not shown), and detecting a light pulse passing through the grid by a photodetector (not shown).

By "connecting or disconnecting the outputs of photomultipliers" is meant, for example, that the output lines of the photomultipliers are connected or disconnected, namely switches on the output lines are turned on and off.

On the basis of the output of the position detection means 20, the first switching section 18 connects or disconnects the outputs of the photomultipliers 91, 92 93 and 94 so that only the outputs the photomultipliers which are positioned within a predetermined range in the vicinity of the scanning point G and which can receive the light emitted by the scanning point G are connected to an operation means 21.

The second switching section 19 connects or disconnects the outputs of the photomultipliers 91, 92, 93 and 94 on the basis of the signal generated by the position detection means 20 so that only the outputs of photomultipliers outside of the photomultipliers positioned within the predetermined range in the vicinity of the scanning point G to the operation means 21.

The predetermined range in the vicinity of the scanning point G where the photomultipliers can receive the light emitted by the scanning point G may be determined in accordance with the read-out purpose, the manner of read-out or the like. Therefore, the photomultipliers, the outputs of which should be connected or disconnected, may be determined with reference to the position of the scanning point G.

Connection and disconnection of the outputs of the photomultipliers 91, 92, 93 and 94 by the switching sections 18 and 19 are conducted in accordance with the movement of the scanning point G. Specifically, the connection and disconnection may be conducted as described below when four photomultipliers are provided as shown First, when the scanning point G is within the range H1 as shown, the first switching section 18 turns on the output lines of the photomultipliers 91 and 92, and turns off the output lines of the photomultipliers 93 and 94. Also, the second switching section 19 turns off the output lines of the photomultipliers 91 and 92, and turns on the output lines of the photomultipliers 93 and 94. When the scanning point G is within the range H2 between the middle point of the light guide member piece 82 and the middle point of the light guide member piece 83, the first switching section 18 turns on the output lines of the photomultipliers 92 and 93, and turns off the output lines of the photomultipliers 91 and 94. Also, the second switching section 19 turns on the output lines of the photomultipliers 91 and 94, and turns off the output lines of the photomultipliers 92 and 93. When the scanning point G is within the range H3, the first switching section 18 turns on the output lines of the photomultiplier 93 and 94, and turns off the output lines of the photomultipliers 91 and 92. Further, the second switching section 19 turns on the output lines of the photomultipliers 91 and 92, and turns off the output lines of the photomultipliers 93 and 94.

The outputs of the first switching section 18 and the section switching section 19 are sent to the operation means 21 which subtracts the total of the outputs of the second switching section 19 multiplied respectively by a predetermined coefficient from the total of the outputs of the first switching section 18 The result of the subtraction is used as the read-out image signal detected at each scanning point.

Specifically, for example, the outputs of the photomultipliers connected by the first switching section 18 are added by a first adder 22 On the other hand, the outputs of the photomultipliers connected by the second switching section 19 are added by a second adder 23, and the result of the addition is multiplied by a predetermined coefficient $\alpha$ by a multiplier 24. Then, a subtracter 25 subtracts the output of the multiplier 24 from the output of the first adder 22.

Basically, the present invention is based on the idea as described below. Namely, almost all of the light emitted by the scanning point G is detected by the photomultipliers positioned within the predetermined range in the vicinity of the scanning point G, and almost all of the light detected by the other photomultipliers is the radiation after-glow. Therefore, the amount of the radiation after-glow detected by the former photomultipliers may be calculated by multiplying the outputs of the latter photomultipliers by the predetermined coefficient, for example, the ratio of the radiation after-glow detecting area of the former photomultipliers to the radiation after-glow detecting area of the latter photomultipliers. By subtracting the outputs of the latter photomultipliers multiplied by the predetermined coefficient from the outputs of the former photomultipliers, it is possible to obtain the read-out image signal representing only the light emitted by the stimulable phosphor sheet in proportion to the stored radiation energy and free from the component of radiation after-glow.

Accordingly, the aforesaid predetermined coefficient is used for calculating the component of the radiation afterglow contained in the outputs of the former photomultipliers from the outputs of the latter photomultipliers based on the relationship between the former photomultipliers and the latter photomultipliers, and may be determined on the basis of a calculation or experimentally. In the aforesaid embodiment, the multiplier 24 positioned after the adder 23 may be positioned before or after the second switching section 19. In this case, it is necessary to provide each of the output lines of the photomultipliers with the multiplier 24.

Figure 2:
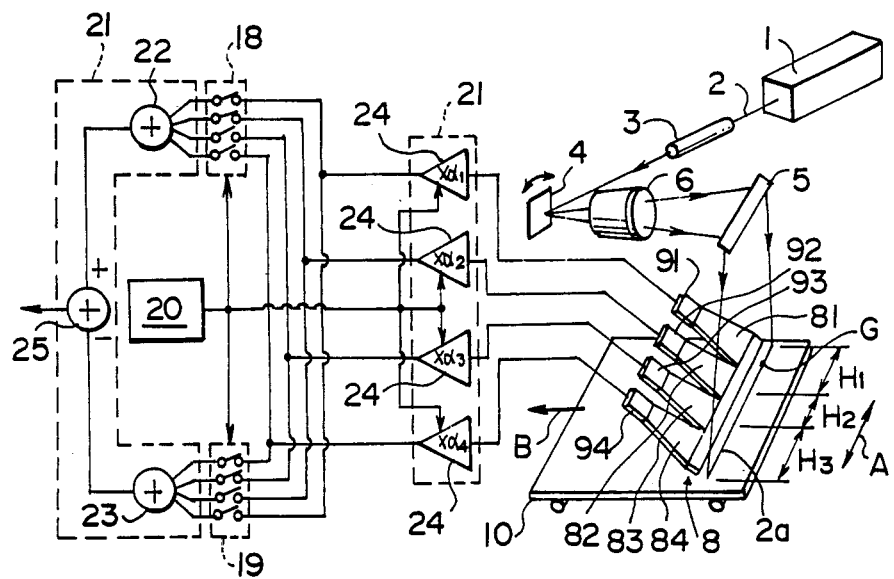
FIG. 2 is a schematic view showing another embodiment of the radiation image read-out apparatus in accordance with the present invention.

FIG. 2 shows another embodiment of the radiation image read-out apparatus in accordance with the present invention. In this embodiment, the multipliers 24, 24, . . . are positioned prior to the branching points of the output lines of the photomultipliers 91, 92, 93 and 94 to the first switching section 18 and the second switching section 19. Predetermined coefficients $\alpha 1$, $\alpha 2$, $\alpha 3$, and $\alpha 4$ used in multiplication by the multipliers 24, 24, . . . are changed on the basis of the output of the scanning position detection means 20. When the scanning point G is within the range H1, it is possible to weight the outputs of the photomultipliers 91 and 92 sent to the first switching section 18 and to change the weighting degrees in accordance with the movement of the scanning point G. When the outputs of the photomultipliers 93 and 94 are sent to the second switching section 19, it is possible to multiply the outputs by the predetermined coefficient in the same sense as described with reference to FIG. 1 and to weight the outputs and change the weighting degrees in accordance with the movement of the scanning point G.

The output of the operation means 21 may be sent to the correction circuit 13 and the image processing circuit 14, and is used to reproduce a visible image on a CRT 15 or is recorded on a magnetic tape 16.

The present invention excludes the case where two photodetectors are positioned side by side since the method described above is not operable appropriately.

I claim:

1. A radiation image read-out method for scanning a line on a stimulable phosphor sheet carrying a radiation image stored therein by stimulating rays which cause the stimulable phosphor sheet to emit light in proportion to the stored radiation energy, and detecting the emitted light by a photoelectric read-out means;

wherein the improvement comprises the steps of:
(i) conducting detection by said photoelectric read-out means by use of a photoelectric read-out means comprising three or more photodetectors which are positioned side by side in the scanning line direction and which simultaneously detect the emitted light during scanning,
(ii) from the output of at least one of said photodetectors which receives the light emitted by a scanning point, subtracting the outputs of the other of said photodetectors multiplied by a predetermined coefficient, and
(iii) using the result of the subtraction as the read-out image signal.

2. A method as defined in claim 1 wherein said photoelectric read-out means comprises an elongated light guide member, three or more light guide member pieces connected to said light guide member, and said three or more photodetectors connected respectively to said light guide member pieces.

3. A method as defined in claim 1 wherein the outputs of said photodetectors are weighted independently of each other, and the weighting coefficients are adjusted in accordance with the movement of said scanning point.

4. A radiation image read-out apparatus provided with a stimulating ray source for emitting stimulating rays, a light deflection means for scanning a stimulable phosphor sheet carrying a radiation image stored therein by said stimulating rays which cause said stimulable phosphor sheet to emit light in proportion to the stored radiation energy, and a photoelectric read-out means for detecting the emitted light, wherein the improvement comprises the provision of:
(i) three or more photodetectors constituting said photo-electric read-out means and positioned side by side in the scanning line direction,
(ii) a position detection means for detecting the position of a scanning point, (iii) a first switching section operable for connecting or disconnecting the output of each of said photodetectors, during the scanning of a line, on the basis of information on the position of the scanning point generated by said position detection means so that only the output of at least one of said photodetectors which is positioned within a predetermined range in the vicinity of the scanning point is connected, (iv) a second switching section, operable simultaneously with said first switching section, for connecting or disconnecting the output of each of said photodetectors, during said scanning, on the basis of information on the position of the scanning point generated by said position detection means so that only the output of at least one of said photodetectors which is positioned outside of said at least one of said photodetectors which is positioned within the predetermined range in the vicinity of the scanning point is connected, and (v) an operation means for subtracting the total of the output at said second switching section multiplied by a predetermined coefficient from the total of the output at said first switching section.

5. An apparatus as defined in claim 4 wherein said photoelectric read-out means comprises an elongated light guide member, three or more light guide member pieces connected to said light guide member, and said three or more photodetectors connected respectively to said light guide member pieces.

6. An apparatus as defined in claim 4 wherein said operation means is constructed so that the outputs of said photodetectors are weighted independently of each other, and the weighting coefficients are adjusted in accordance with the movement of said scanning point.

* * * * *